United States Patent [19]
Kishimi

[11] Patent Number: 4,996,537
[45] Date of Patent: Feb. 26, 1991

[54] METHOD OF AND APPARATUS FOR RECORDING IMAGE

[75] Inventor: Kazutomo Kishimi, Tokyo, Japan

[73] Assignee: Fuji Photo Film Co., Ltd., Kanagawa, Japan

[21] Appl. No.: 399,060

[22] Filed: Aug. 28, 1989

[30] Foreign Application Priority Data

Aug. 31, 1988 [JP] Japan .................................. 63-219554

[51] Int. Cl.$^5$ ......................... G01D 15/10; G03C 5/16
[52] U.S. Cl. .................................. 346/1.1; 346/76 PH; 430/348
[58] Field of Search .................. 346/76 R, 76 PH, 1.1; 430/147, 151, 348, 138; 428/913, 207

[56] References Cited

U.S. PATENT DOCUMENTS 4,346,449 8/1982 Ovshinsky et al. .................. 364/900

FOREIGN PATENT DOCUMENTS 62-60646 3/1987 Japan .

Primary Examiner—Bruce A. Reynolds
Assistant Examiner—Gerald E. Preston
Attorney, Agent, or Firm—Sughrue, Mion, Zinn, Macpeak & Seas

[57] ABSTRACT

An image is recorded on an image recording material by energizing a thermal head having a plurality of heating elements with input image data. As the image recording material, there is employed a heat sensitive recording material comprising a support coated with a coating solution which makes an unheated area colored and a heated area transparent in a colorless or light colored manner. An image is recorded on the heat sensitive recording material with the thermal head by processing the image data through negative-positive reversal and applying the processed image data to the thermal head. The image data are processed through negative-positive reversal by converting the image data based on a function which has the input image data as a variable and a negative differential coefficient.

6 Claims, 4 Drawing Sheets

METHOD OF AND APPARATUS FOR RECORDING IMAGE

BACKGROUND OF THE INVENTION

The present invention relates to a method of and an apparatus for recording an image, and more particularly to a method of and an apparatus for thermally recording an image, characters, or the like on a heat sensitive recording material with a thermal head, such that an image having a large blackened area can be reproduced with a high image quality, using a heat sensitive recording material which comprises a support coated with a coating solution that makes a thermally recorded area transparent and the other area black.

Various new medical image diagnostic apparatus such as ultrasonic imaging apparatus, X-ray computerized tomographic apparatus, and nuclear magnetic resonance imaging apparatus have recently been widely used in addition to conventional X-ray photographic apparatus in the medical field. In such medical image diagnostic apparatus, an ultrasonic beam or X-ray is applied to the body of a patient, and any change in the utrasonic or X-ray energy that has passed through or been reflected from the patient's body is detected. Based on the detected change image information of a localized region in the patient's body is produced. The image information is then displayed on a CRT monitor, for example. A doctor is required to diagnose the localized region of the patient's body by looking at the image displayed on the CRT monitor. Other localized regions of the patient's body can also be easily observed in the same manner as described above when it is desired to do so. Therefore, the diagnostic process can be carried out accurately and quickly.

It is sometimes necessary for the doctor to send monitored images to other hospitals or to look at time-dependent changes of localized regions together with patients. In view of this, it has been desired to record monitored images permanently on recording mediums. Various image recording apparatus have been developed and used to meet such a demand. Such image recording apparatus include a multiformat camera for recording images displayed on a CRT monitor or a photosensitive material through an optical system, and a laser beam printer for modulating the intensity of a light beam with a video signal representing an image displayed on a CRT monitor and recording the image on a photosensitive recording material with the intensity-modulated light beam.

These image recording apparatus are however large in size since they comprise a CRT monitor, a light detector, etc., and an optical system including these devices occupy a large space in the apparatus. If such an image recording apparatus is used for a medical application, it must be combined with an automatic developing machine which can rapidly produce a photographic film with a fixed image thereon for immediate medical diagnosis. The image recording apparatus and the automatic developing machine associated therewith are much larger in size.

Materials such as photographic films used for medical diagnosis are legally required to be kept as records for a certain period of time. Therefore, hospitals and other medical institutions must have a considerably large space for keeping such records, and the space available in these organizations should be efficiently utilized. The large size image recording apparatus however do not meet the requirement for such efficient space utilization.

Heat sensitive recording processes employing heat sensitive materials for thermally recording images thereon are finding wide use in facsimile receivers and printers since the processes are easy to perform, the apparatus used are simple in structure and inexpensive to manufacture.

Photographic films on which images of localized regions of patent's bodies are recorded based on video signals produced by X-ray photographic apparatus, ultrasonic imaging apparatus, X-ray computerized tomographic apparatus, and nuclear magnetic resonance imaging apparatus are observed by doctors for medical diagnosis of the imaged localized regions while these films are being placed on a light table such as an illuminating box. An image thermally recorded on a film using a thermal head has a large blackened area so that the eyes of the observer will not be glared by any reflected light from the film, as shown in FIG. 1 of the accompanying drawings.

When a film 2 (FIG. 1) paced on a light table is observed, the intensity of light passing through a non-image area 6 on the peripheral portion of the film which is not blackened is larger as compared with an image area 4 where the image is thermally recorded. Therefore, the image area 4 which contains necessary information for the doctor may not be clearly visually recognized. The conventional heat sensitive recording mediums make thermally recorded areas black. Therefore, the thermal head for recording images is heated almost at all times. To prevent the apparatus from increasing its temperature excessively, a heat radiating fan and large-size heat radiating fins for allowing active components to operate reliably are required by the apparatus, with the result that the apparatus become large in size. When medical images are successively recorded using a thermal head, the heat stored in the thermal head is greatly increased, and it becomes highly difficult to produce images of stable densities.

Under the circumstances, there has been a demand for a heat sensitive material in which only an area recorded by a thermal head is made transparent and the other background area is of a high-density color such as black, so that the developed image on the heat sensitive material can be viewed on a light table or an overhead projector.

To meet such a demand, a heat sensitive recording material has been developed as disclosed in Japanese Pat. application No. 62-60646 filed by the applicant. The disclosed heat sensitive recording material is produced by coating on a support and drying a coating composition containing an emulsion prepared by dissolving a colorless or light colored electron-donating dye precursor and a color developer in an organic solvent which is slightly soluble or insoluble in water, and forming the resulting solution into an emulsified dispersion, and microcapsules containing a decolorizer. The heat sensitive recording material forms a color in an unheated area from the reaction product of the dye precursor with the color developer, and the color is decolorized at a heated area by the decolorizer oozing out of the microcapsules through their thermoresponsive walls. When the heat sensitive recording material is placed on a light table, the background is viewed as colored, and the thermally recorded area is viewed as a colorless or light colored, or transparent or low-density colored image, depending on the thermal energy applied to the heat sensitive recording material.

SUMMARY OF THE INVENTION

It is a general object of the present invention to provide a method of and an apparatus for thermally recording an image, characters, or the like on a heat sensitive recording material of the type described above with a thermal head, such that the same image is reproduced in an image area 4 (FIG. 1) whereas an image colored at a prescribed density is formed in a non image area 6, by applying an image signal reversed in negative-positive relationship to the thermal head, so that an image thermally recorded on the heat sensitive recording material can easily be visually recognized when it is observed on a light table such as an illuminating box.

Another object of the present invention is to provide a method of recording an image on an image recording material by energizing a thermal head having a plurality of heating elements with input image data, the method comprising the steps of employing, as the image recording material, a heat sensitive recording material comprising a support coated with a coating solution which makes an unheated area colored and a heated area transparent in a colorless or light colored manner, and recording an image on the heat sensitive recording material with the thermal head by processing the image data through negative-positive reversal and applying the processed image data to the thermal head.

Still another object of the present invention is to provide the method wherein the image data are processed through negative-positive reversal by converting the image data based on a function which has the input image data as a variable and a negative differential coefficient.

Yet another object of the present invention is to provide an apparatus for recording an image on a heat sensitive recording material comprising a support coated with a coating solution which makes an unheated area colored and a heated area transparent in a colorless or light colored manner, the apparatus comprising negative-positive reversal means for processing the input image data through negative-positive reversal, and a thermal head having a plurality of heating elements energizable by the processed image data for recording an image on the heat sensitive recording material held against the thermal head based on the processed image data.

A further object of the present invention is to provide the apparatus further including an A/D converter for converting the input image data into digital image data, and a frame memory for storing one frame, at a time, of the digital image data, the the negative-positive reversal means comprising a negative-positive reversal processor for reversing the negative-positive relationship of the digital image data based on a function which has the digital image data as a variable and a negative differential coefficient.

A still further object of the present invention is to provide the apparatus wherein the heating elements of the thermal head produce thermal energy in response to the image data applied thereto, the thermal energy being of an intensity which increases depending on the amount of electric energy applied to the heating elements, the processed image data comprising data for reducing the amount of electric energy applied to the heating elements in proportion to the density of the processed data.

A yet further object of the present invention is to provide the apparatus wherein the amount of electric energy is determined depending on the number of pulses applied to the heating elements within a predetermined period of time.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 2:
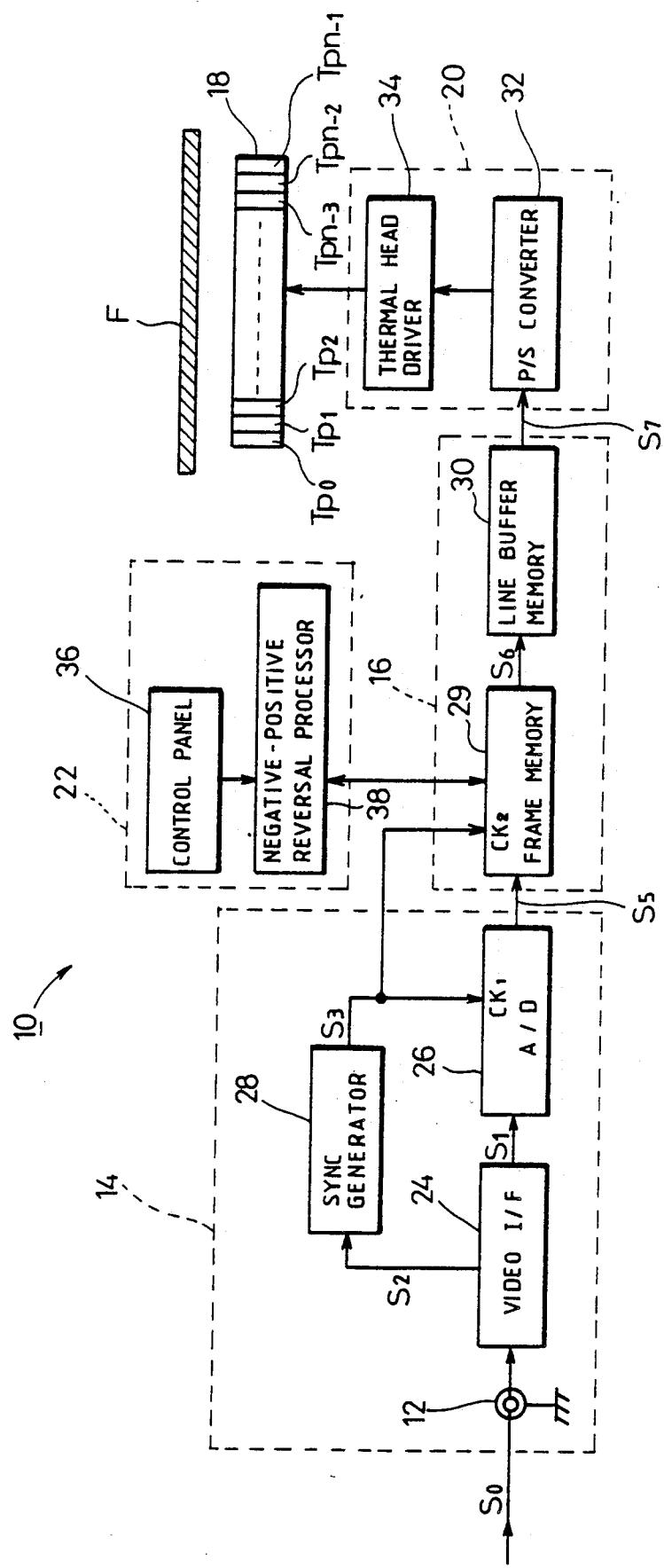
FIG. 2 is a circuit diagram of a thermal head drive system in an image recording apparatus according to the present invention.

As shown in FIG. 2, an image recording apparatus according to the present invention includes a thermal head drive system generally denoted at 10. The thermal head drive system 10 basically includes a video signal reading unit 14 for reading a video signal applied from a video signal input terminal 12, a video signal memory unit 16 for temporarily storing an output signal from the video signal reading unit 14, a thermal head drive unit 20 responsive to an output signal from the video signal memory unit 16 for driving a thermal head 18, and a negative positive reversal effecting unit 22 for reversing the negative-positive relationship of the density of an image stored in the video signal memory unit 16.

The video signal reading unit 14 has a video interface (I/F) 24 to which a composite video signal $S_0$ including a video signal and a synchronizing signal is applied from an X-ray computerized tomographic apparatus (not shown), the composite video signal $S_0$ representing information on a sectional image of a human brain. The composite video signal $S_0$ is separated into a video signal $S_1$ and a composite sync signal $S_2$ by the video I/F 24. The video signal $S_1$ is applied from the video I/F 24 to a signal input terminal of an A/D converter 26, and the composite sync signal $S_2$ is applied from the video I/F 24 to a sync generator 28. A clock signal $S_3$ is supplied from the sync generator 28 to a clock input terminal $CK_1$ of the A/D converter 26.

An output signal $S_5$ representing digital image data from the A/D converter 26 is applied to a frame memory 29 each time the clock signal $S_3$ is supplied to a clock input terminal $CK_2$ of the frame memory 29. The data stored in the frame memory 29 are reversed between negative and positive under the control of a negative-positive reversal processor 38 in response to an image negative-positive reversal command applied through a control panel 36 which may comprise a keyboard, for example.

The frame memory 29 supplies line data $S_6$ to a line buffer memory 30 having as many memory addresses as the number of heating elements of the thermal head 18. The line buffer memory 30 then supplies line data S, through a parallel/serial (P/S) converter 32 to a thermal head driver 34 comprising a shift register, etc.

The thermal head driver 34 applies an output signal to $\underline{n}$ heating elements $Tp0$ through $Tpn-1$ of the thermal head 18. An image represented by the supplied output signal is thermally recorded by the heating elements $Tp0$ through $Tpn-1$ on a heat sensitive recording material F which is fed in an auxiliary scanning direction by a feed mechanism (not shown).

Figure 1:
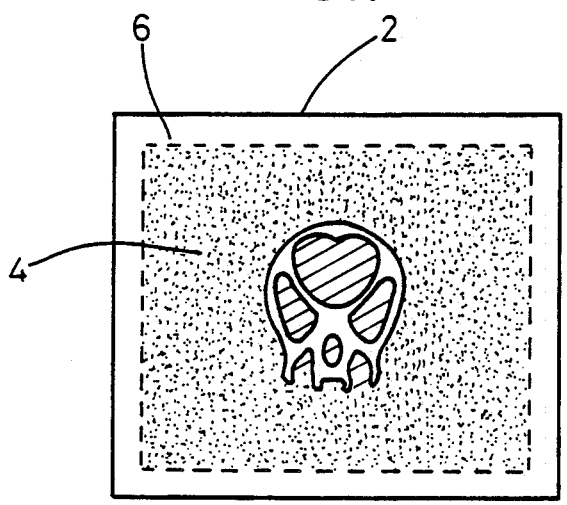
FIG. 1 is a schematic view of an image formed on a film produced by a conventional image recording apparatus.
Figure 3:
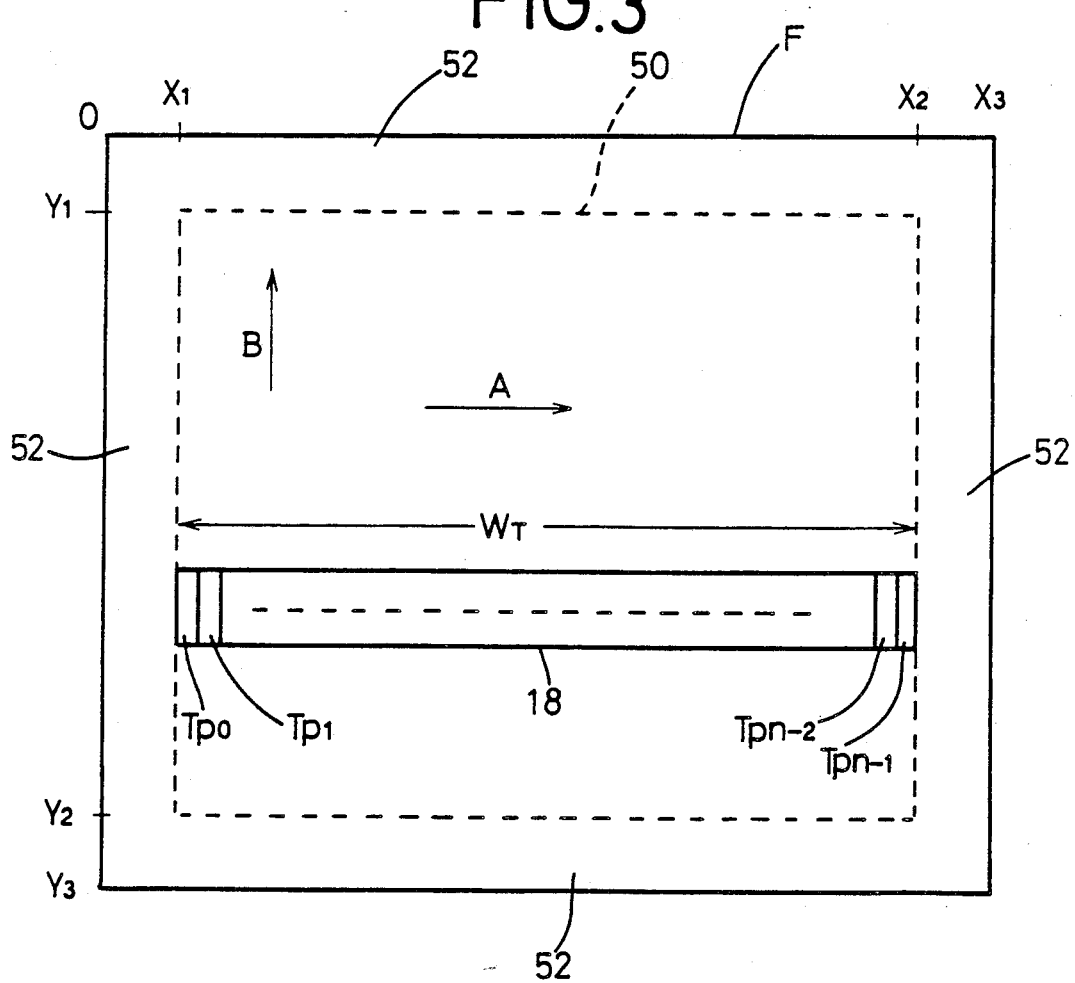
FIG. 3 is a view showing the positional relationship between a heat sensitive recording material and a thermal head.

The heating elements $Tp0$ through $Tpn-1$ and the heat sensitive recording material F are positioned relatively to each other as shown in FIG. 3. More specifically, the $\underline{n}$ heating elements $Tp0$ through $Tpn-1$ of the thermal head 18 which has an effective printing width $W_T$ are arrayed in a main scanning direction (indicated by the arrow A) which is normal to the auxiliary scanning direction (indicated by the arrow B) in which the transparent heat sensitive film F is fed. An image recording area (hereinafter referred to as an "image area") 50 on the heat sensitive recording material F is a region lying between positions $X_1$, $X_2$, in the main scanning direction and positions $Y_1$, $Y_2$, in the auxiliary scanning direction. The heat sensitive recording material F also has a non-image recording area (hereinafter referred to as a "non-image area") 52 lying between positions 0, $X_1$ and between positions $X_2$, $X_3$ in the main scanning direction and also between positions 0, Y and between positions $Y_2$, $Y_3$ in the auxiliary scanning direction.

The heat sensitive recording material F is made of the heat sensitive recording material as disclosed in Japanese Pat. application No. 62-60646.

More specifically, the heat sensitive recording material is produced by coating on a support and drying a coating composition containing an emulsion prepared by dissolving a colorless or light colored electron-donating dye precursor and a color developer in an organic solvent which is slightly soluble or insoluble in water, and forming the resulting solution into an emulsified dispersion, and microcapsules containing a decolorizer. The heat sensitive recording material forms a color in an unheated area from the reaction product of the dye precursor with the color developer, and the color is decolorized at a heated area by the decolorizer oozing out of the microcapsules through their thermoresponsive walls. When the heat sensitive recording material is placed on an overhead projector and the recorded image is projected, the background of the image is viewed as colored, and the image area thereof is viewed as colorless or light colored.

The nature of the support is not restricted. Suitable examples of transparent film supports which can be used include a synthetic polymer film such as of a polyester, acrylic resin, styrene/acrylic copolymer or celluose film. When the support is of paper, on the other hand, a negative-type heat sensitive material is obtained. The electron-donating or basic dye precursors employed in the present invention are selected suitably from known colorless or light colored compounds of the kind which can develop their colors by donating an electron or accepting a proton of an acid. These compounds have a skeleton such as that of a lactone, lactam, sultone, spiropyran, ester, or amide as a part of their structures, and these skeletons undergo ring-opening or bond cleavage upon contact with a color developer. Preferred examples of such compounds include triarylmethane compounds, diphenylmethane compounds, xanthene compounds, thiazine compounds, and spiropyran compounds.

Color developers employed in the present invention, which undergo the color development reaction with electron-donating colorless precursors can be selected from known color developers. Suitable examples of color developers to be used with leuco dyes include phenol compounds, triphenyl methane compounds, sulfur-containing phenolic compounds, carboxylic acid compounds, sulfone compounds, urea and thiourea compounds. Details of the color developers are described, e.g., in "Kami Pulp Gijutsu Times" Japan, pp. 49–54 and 65–70 (1985). Of such color developers, those having melting points of 50°C. to 250°C., particularly phenols and organic acids which have melting points of 60°C. to 200°C. and are barely soluble in water, are preferred over others. The combined use of two or more color developers is desirable because of the resultant increase in solubility.

Color developers particularly preferred in the present invention are represented by the following general formulae [I] through [V]:

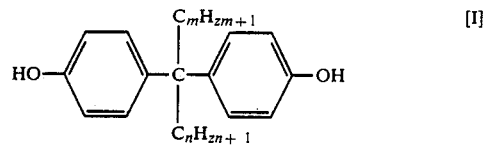

[I]

wherein $m = 0 \sim 2$ and $n = 2 \sim 11$.

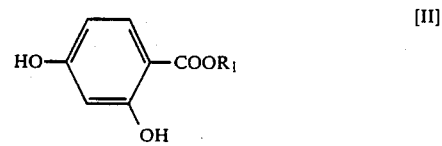

[II]

$R_1$ is an alkyl group, an aryl group, or an aralkyl group. In particular, a methyl group, an ethyl group, and a butyl group are preferred as $R_1$.

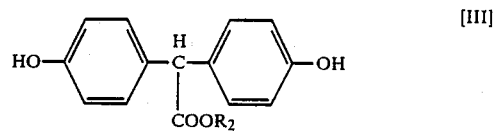

[III]

$R_2$ is an alkyl group. In particular, a butyl group, a pentyl group, a heptyl group, and an octyl group are preferred as $R_2$.

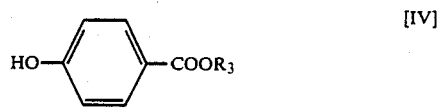

[IV]

$R_3$ is an alkyl group or an aralkyl group.

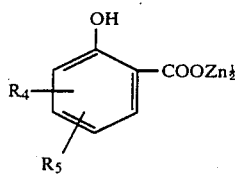

$R_4$ and $R_5$ are each represent a hydrogen atom, a halogen atom, a hydroxyl group, a nitro group, an alkyl group, an allyl group, an aralkyl group, or an alkylallyl group.

To the above developers, it is possible to add a photo discoloration inhibitor as described, e.g., in Japanese Pat. applications Nos. 60-125470, 60-125471, and 60-125472, if desired.

Such a color developer is used in the form of an emulsified dispersion. The dispersion can be prepared by dissolving the electron-donating dye precursor and the color developer in an organic solvent slightly soluble or insoluble in water, and mixing the resulting solution with an aqueous phase which contains a surface active agent and a water-soluble high polymer as a protective coloid, to emulsify and disperse the solution in the aqueous phase.

The organic solvent in which the electron-donating dye precursor and the color developer can be suitably selected from oily solvents which are customarily used in a pressure-sensitive recording material. Of such solvents, oils having more than two benzene rings and a small number of hetero atoms in the oil are preferred. Such oils are compounds represented by the following general formulae [VI] to [VIII], triarylmethanes (such as tritoluylmethane, toluyldiphenylmethane), terphenyl compounds (such as terphenyl), alkylated diphenyl esters (such as propyldiphenyl ester), hydrogeneted terphenyl compounds (such as hyxahydroterphenyl), diphenyl ethers, and so on.

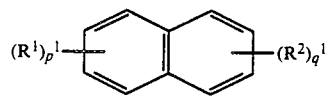

In the above formula, $R^1$ represents a hydrogen atom, or an alkyl group containing 1 to 18 carbon atoms; $R^2$ represents an alkyl group containing 1 to 18 carbon atoms; and $p^1$ and $q^1$ each represent an integer of 1 to 4, provided that the total number of alkyl groups therein is 4 or less. Preferred alkyl groups represented by $R^1$ and $R^2$ are those containing 1 to 8 carbon atoms.

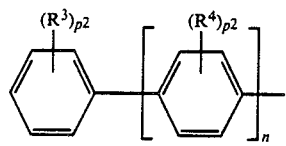

In the above formula, $R^3$ represents a hydrogen atom or an alkyl group containing 1 to 12 carbon atoms; $R^4$ represents an alkyl group containing 1 to 12 carbon atoms; and n is 1 or 2. $p^2$ and $q^2$ each represent an integer of 1 to 4. The total number of alkyl groups is 4 or less in case of n=1, while it is 6 or less in case of n=2.

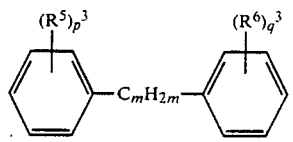

In the above formula, $R^5$ and $R^6$, which may be the same or different, each represent a hydrogen atom, or an alkyl group containing 1 to 18 carbon atoms. m represents an integer of 1 to 13. $p^3$ and $q^3$ each represent an integer of 1 to 3, provided that the total number of alkyl groups is 3 or less.

Of alkyl groups represented by $R^5$ and $R^6$, those containing 2 to 4 carbon atoms are particularly preferred.

Specific examples of the compounds represented by the formula [VI] include dimethylnaphthalene, diethylnaphthalene, and diisopropylnaphthalene.

Specific examples of the compounds represented by the formula [VII] include dimethylbiphehyl, diethylbiphenyl, diisopropylbiphenyl, and diisobutylbiphenyl.

Specific examples of the compounds represented by the forumula [VIII] include 1-methyl-1-dimethylphenyl-1-phenylmethane, 1-ethyl-1-dimethylphenyl-1-phenylmethane, and 1-propyl-1-diethylphenyl-1-phenylmethane.

The above-cited oils can be used as a mixture of two or more thereof, or in combination with other oils.

Organic solvents having a lower boiling point can be added as a dissolution assistant to the foregoing organic solvents. Some of these additional organic solvents are preferably ethyl acetate, iropropyl acetate, butyl acetate, methylene chloride, and the like.

Water soluble high polymers to be contained as a protective colloid in an aqueous phase, which is to be mixed with an oily phase wherein the electron donating dye precursor and the color developer are dissolved, can be selected suitably from known anionic, nonionic or amphoteric high polymers. Of these high polymers, polyvinylalcohol, gelatin, cellulose derivatives and the like are preferred.

Surface active agents to be contained additionally in the aqueous phase can be selected suitably from anionic or nonionic surface active agents of the kind which do not cause any precipitation or condensation by interaction with the above-described protective colloids. As examples of surface active agents which can be preferably used, mention may be made of sodium alkylbenzenesulfonates (such as sodium dodecylbenzenesulfonate), sodium alkyl sulfate (such as sodium lauryl sulfate), sodium dioctylsulfosuccinates, and polyaklylene glycols (such as polyoxyethylene nonylphenyl ether).

An emulsified dispersion of electron-donating dye precursor and color developer can be prepared with ease by mixing an oil phase containing an electron-donating dye precursor and a color developer and an aqueous phase containing a protective colloid and a surface active agent with a general means for preparing a fine grain emulsion, such as a high speed stirrer, an ultrasonic disperser, or the like to disperse the former phase in the latter phase.

To the emulsified dispersion thus obtained, melting point depressants for the color developers can be added, if desired. Some of these melting point depressants have such a function as to control glass transition points of the capsule walls described hereinbefore, too. Specific examples of such melting point depressants include hydroxy compounds, carbamate compounds, sulfonamide compounds, and aromatic methoxy compounds. Details of these compounds are described in Japanese Pat. application No. 59-244190, for example.

This melting point depressant can be used in an amount of 0.1 to 2 parts by weight preferably 0.5 to 1 parts by weight, for 1 part by weight of color developer whose melting point is to be depressed. It is desirable that the melting point depressant and the color developer, whose melting point can be depressed thereby, should be together within the same capsule or not encapsulated. When they are separated, a preferred addition amount of the melting point depressant is 1 to 3 times that of the color developer.

A suitable amount of the color developers to be coated is in the range of from 0.05 to 8 $g/m^2$, and that of the electron-donating dye precursor is in the range of from 0.02 to 4 $g/m^2$.

A decolorizer has a decolorizing effect on the color-producing system constituted of the basic dye precursor and the color developer. Examples of useful decolorizers are:

(a) adducts prepared from bisphenols and alkylene oxides (as described in Japanese Pat. application No. 53-46689);

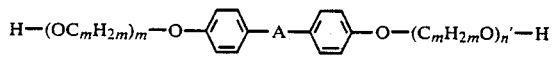

wherein A represents a methylene or alkylidene group.

(b) methylol amides and bisamides, having a melting point of 110°C. or higher (as described in Japanese Pat. application No. 53-80557);

(c) long-chain 1,2-glycols (as described in Japanese Pat. application No. 53-96563);

(d) a terephthalic acid/ethylene oxide adduct (as described in Japanese Pat. application No. 53-96666);

(e) solid alcohols, such as stearyl alcohol, tripropyl carbinol, polyethylene gycol, polypropylene glycol, 1,8-octane diol or dimethyl pentaglycerine, 1,2 3,4-tetraoxybutane (as described in Japanese Pat. Publication No. 50-17865);

(f) polyesters or polyethylene glycol derivatives, such as polyoxydecamethylene, polyoxymethylene, polyethylene oxide, trimethylene oxide polymers, 1,3-dioxolan polymers, polyoxyethylene alkylamines, sorbitane monostearate, polyoxyethylene oleyl ether, polyethylene glycol monostearate, polyoxyethylene alkylamides, or oxyethylene alkylamines (as described in Japanese Pat. Publications Nos. 50-17867 and 50-17868);

(g) acetamide, stearoamide, phthalonitrile, m-nitroaniline, β-naphthylamine (as described in Japanese Pat. Publication No. 51-19991);

(h) guanidine derivatives, such as 1,3-dichlorohexyl-2-phenylguanidine, 1,3-dicyclohexyl-2-naphthylguanidine, 2,3-dicyclohexy-1-phenylguanidine, or 1,2,3-triphenylguanidine (as described in Japanese Pat. Publication No. 51-29024); and (i) amines or quaternary ammonium salts, such as hexadecylamine, tribenzyl amine, N,N,N',N'- tetrabenzylethylenediamine, tricyclohexylamine, dioctadecylamine, 2-aminobenzoxazole, doecyltrimethylammonium chloride, or hexadecyltrimethylammonium chloride (as described in Japanese Laid-Open (Unexamined) Pat. Publication No. 50-18048).

The decolorizer is applied in an amount large enough to decolorize the color produced from the basic dye, which can be determined experimentally. In general, a preferable amount of the decolorizer used ranges from 0.05 to 8 $g/cm^2$.

The microencapsulation of such a decolorizer as described above can prevent decolorization from occurring during production of the heat sensitive material, and at the same time ensures improvements in properties of keeping both the freshness of the heat sensitive material and the recording made therein. Moreover, the image density attainable at the time of recording can be heightened by making appropriate choices of a wall material and a process for preparing the microcapsules.

Suitable examples of wall materials for microcapsules include polyurethane, polyurea, polyester, polycarbonate, urea/formaldehyde resin, melamine resin, polystyrene, styrene/methacrylate copolymer, styrene/acrylate copolymer, gelatin, polyvinyl pirrolidone, and polyvinyl alcohol. These macromolecular substances can be used in combination of two or more thereof.

Of the above-cited macromolecular substances, polyurethane, polyurea, polyamide, polyester, and polycarbonate are preferred. In particular, polyurethane and polyurea can bring about good results.

Microcapsules to be employed in the present invention are preferably prepared by emulsifying a core material containing a reactive substance like a color former, and then forming a wall of a macromolecular substance around the droplets of the core material to microencapsulate the core material. Reactants to produce a macromoecular substance are added to the inside and/or the outside of the oily droplets. For details of microcapsules which can be preferably employed in the present invention, e.g., for production methods of microcapsules which can be preferably used, the description in Japanese Laid-Open Pat. Publication No. 59-222716, for example.

As one of the core materials of the microcapsules, an organic solvent can be added together with the decolorizer. Organic solvents similar to those used to dissolve the electron-donating dye precursors and color developers can be used as the above organic solvents.

In order to keep the transparency high of the thermally printed or recorded area, it is desirable to make the refractive index of the core material of the microcapsules nearly equal to that of the oil phase in which the electron-donating dye precursor and color developer are dissolved.

A preferred size of the microcapsules employed is 2 $\mu$ or less, particularly 1 $\mu$ or less, on a volume average basis according to the evaluation method described in Japanese Laid-Open Pat. Publication No. 60-214990, for example.

Desirable microcapsules which are produced in the above-described manner are not those of the kind which are disrupted by heat or pressure, but those of the kind which have a microcapsule wall through which reactive substances present inside and outside the individual microcapsules respectively can permeate to react with each other.

The heat sensitive recording material can be formed using a coating technique with the aid of an appropriate binder.

As for the binder, water soluble polymers and various kinds of emulsions, such as polyvinyl alcohol, a methyl cellulose, a carboxymethyl cellulose, a hydroxypropyl cellulose, a gum arabic, a gelatin, a polyvinyl pyrrolidone, a casein, styrene butadiene latex, an acrylonitrilebutadiene latex, a polyvinyl acetate emulsion, a polyacrylate emulsion, and an ethylene-vinyl acetate copolymer emulsion can be employed. The amount of the binder used is 0.02 to 5 g/m² on a solid basis.

The heat sensitive recording material of the present invention is produced by providing a heat sensitive layer on a support, such as paper or a synthetic resin film, by coating and drying a coating composition, in which microcapsules enclosing a decolorizer therein and a dispersion containing at least a colorless or light colored electron-donating dye precursor and a color developer in an emulsified condition are contained as main components, and further a binder and other additives are incorporated, according to a conventional coating method, such as a bar coating method, a blade coating method, an air knife coating method, a gravure coating method, a roll coating method, a spray coating method, or a dip coating method. A coverage of the heat sensitive layer is controlled so as to range from 2.5 to 25 g/m² on a solid basis.

For the purpose of prevention of sticking to a thermal head and improvement upon writing quality, the heat sensitive recording material can contain a pigment such as silica, barium sulfate, titanium oxide, aluminum hydroxide, zinc oxide, or calcium carbonate, and finely powdered styrene beads or a urea-melamine resin. In order to maintain the transparency of the heat sensitive layer, it is desirable to provide a protective layer to improve freshness keeping quality and stability of recorded image, adding the above pigments into the protective layer. Details of the protective layer are described, e.g., in the "Kami Pulp Gijutsu Times" (1985, Sep.) pages 2 through 4.

Also, metallic soaps can be used for the purpose of prevention of the sticking phenomenon. A suitable amount of these additives is in the range of from 0.2 to 7 g/m².

A backing layer may be applied to the reverse side of the support in order to improve properties such as curling correction, antistaticness, and smoothness. As components of a backing layer, it is suitable to use similar ones utilized in the protective layer, and an antistatic agent.

The heat sensitive material specified above is employed as the heat sensitive recording material F in the present embodiment.

Operation and advantages of the image recording apparatus and the thermal head drive system for recording an image on the above heat sensitive recording material will be described below.

The image recording apparatus is connected through the video signal input terminal 12 to a medical image diagnostic apparatus such as an X-ray computerized tomographic apparatus, an ultrasonic imaging apparatus, or the like. After an image has been displayed on a monitor of the medical image diagnostic apparatus and observed by a doctor or the like, the image is recorded on the heat sensitive recording material F, which is produced as a hard copy.

When the image on the monitor is confirmed by the doctor or the like, the doctor or the like operates the control panel 36 of the negative-positive reversal effecting unit 22 to give a negative-positive reversal command to the negative-positive reversal processor 38.

Figure 4A:
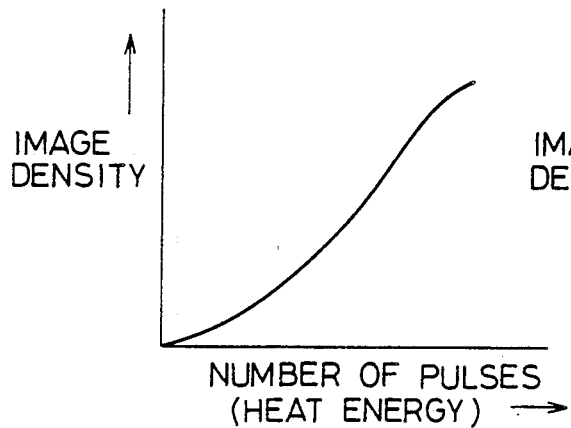
FIGS. 4(a) 4(b) are graphs showing density characteristics of the heat sensitive recording material.
Figure 4B:
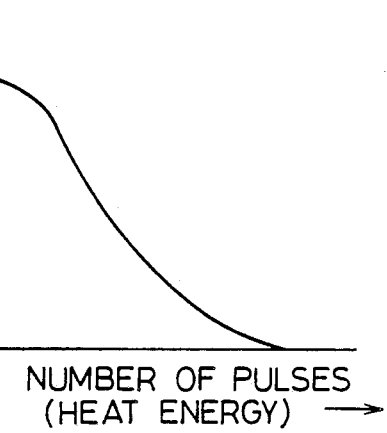

The reasons for carrying out negative-positive reversal and the processing of such negative-positive reversal will be described below. A conventional heat sensitive material in which a thermally printed or recorded area becomes black in color has density characteristics as shown in FIG. 4(a), such that the density on the heat sensitive material varies depending on the number of pulses applied to the heating elements Tp0 through Tpn-1 of the thermal head 18 in a predetermined period of time, i.e., depending on the thermal energy applied. On the other hand, the heat sensitive recording material F according to the present invention in which a thermally printed or recorded area becomes transparent has density characteristics as shown in FIG. 4(b) such that the density on the heat sensitive recording material is inversely proportional to the number of pulses applied, i.e., is reduced as the number of applied pulses or the thermal energy is increased. Thus, when the heat sensitive recording material F is used, the image density thereon must be subjected to negative-positive reversal. More specifically, if 64 image densities can be reproduced on the heat sensitive recording material F, then pulse trains ranging from 0 pulses to 63 pulses are generated which correspond to the image densities. Image data stored in the frame memory 29 thus have 64 density levels of 0, 1, 2, ... 61, 62, 63. Negative-positive reversal can then be carried out by converting such 64 density levels respectively to density levels of 63, 62, 61, ..., 2, 1, 0. The heating elements Tp0 through Tpn-1 of the thermal head 18 may be driven by not only the pulse number modulating method, but also the pulse duration modulating method, the pulse amplitude modulating method, or the like. Stated otherwise, the thermal head 18 may be driven by controlling the amount of electric energy or power supplied to the heating elements Tp0 through Tpn-1 within a given interval of time.

After such a preparatory action, a composite video signal $S_0$ carrying the image information of a localized region of a patient's body is supplied from the medical image diagnostic apparatus to the video I/F 24 through the video signal input terminal 12. The video I/F 24 supplies the signal input terminal of the A/D converter 26 with a video signal $S_1$ with its video signal amplitude and pedestal level adjusted to the full scale voltage of the A/D converter 26. At the same time, the video I/F 24 separates a composite sync signal $S_2$ from the composite video signal $S_0$, and applies the composite sync signal $S_2$, to the sync generator 28. The sync generator 28 comprises a PLL frequency multiplier synthesizer or the like. The frequency of a horizontal synchronizing signal of the composite sync signal $S_2$, is multiplied by the sync generator 28. The frequency-multiplied signal is then applied as a clock signal $S_2$, from the sync generator 28 to the clock input terminals $CK_2$, $CK_2$, of the the A/D converter 26 and the frame memory 29.

Each time the cock signal $S_3$ is applied, the video signal $S_1$ is converted to digital image data $S_5$ by the A/D converter 26, and the digital image data $S_5$ are introduced into the frame memory 29. The digital image data $S_5$ are successively stored in the respective addresses in the frame memory 29 until one frame of image data is stored in the frame memory 29.

Figure 5:
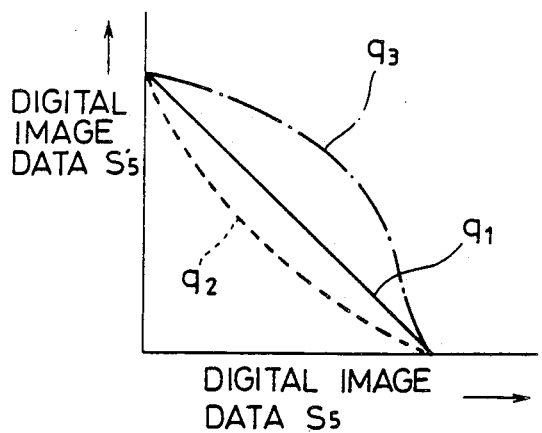
FIG. 5 is a graph illustrative of the negative-positive reversal of image data stored in a frame memory in the thermal head driver system shown in FIG. 2.

As described above, since a negative-positive reversal command is applied from the control panel 36 to the negative-positive reversal processor 38, the digital image data $S_5$ introduced into the frame memory 29 are converted to digital image data $S_5'$ through negative-positive reversal according to an image conversion table defined by a linear function which has the digital image data $S_5$ as its variable and a negative gradient, as indicated by a characteristic curve $q_1$ in FIG. 5.

Figure 6:
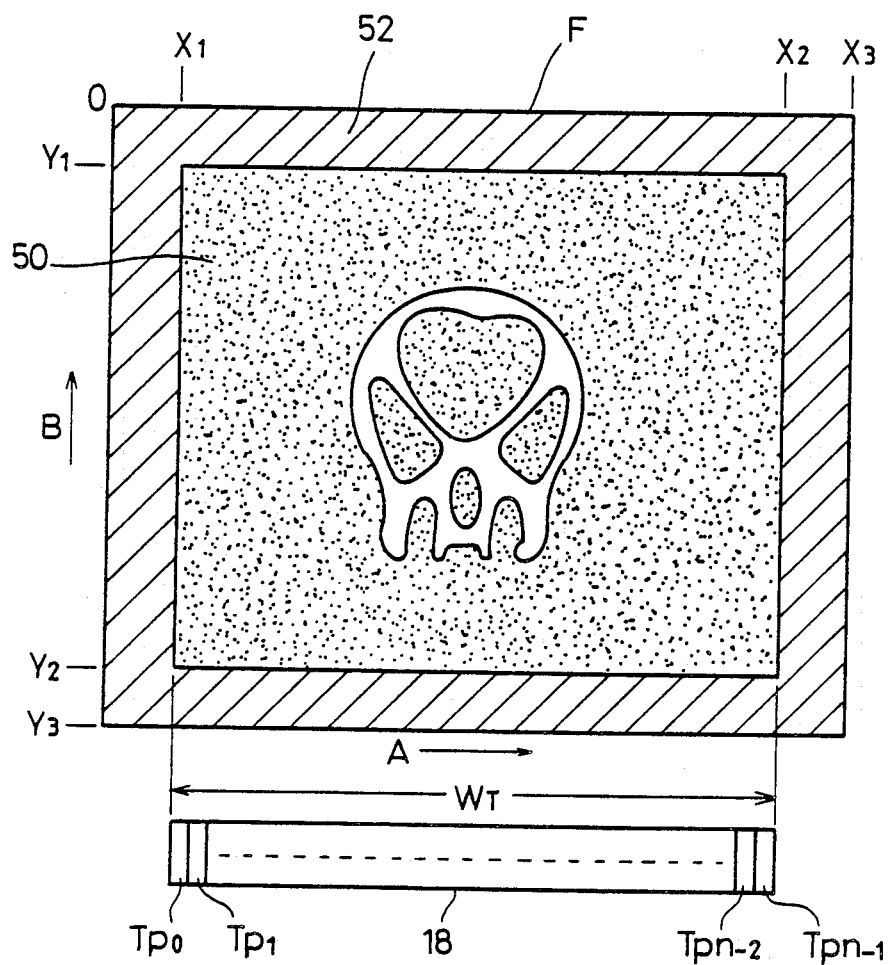
FIG. 6 is a view showing the manner in which an image is thermally recorded on the heat sensitive material by a thermal head.

The negative-positive-converted, one-frame image data S$_5'$ stored in the frame memory 29 are then fed to the line buffer member 30 as one-line data S$_6$ at a time which correspond to one scanning line. The line data S$_6$ fed to the line buffer memory 30 are then converted by the line buffer memory 30 to line data S$_7$ which are then supplied through the P/S converter 32 to the thermal head driver 34. The thermal head driver 34 then supplies the heating elements Tp0 through Tpn-1 of the thermal head 18 with drive current pulses depending on the line data S$_7$, i.e. the pulse number data stored in the memory addresses in the line buffer memory 30. The heating elements Tp0 through Tpn-1 are then heated by the supplied drive current pulses for thermally recording a one-line image on the heat sensitive recording material F. The heat sensitive recording material F, while being pressed against the thermal head 18 by a platen roller (not shown), is fed in the auxiliary scanning direction indicated by the arrow B as shown in FIG. 6. Successive thermal recording of one-line image data on the heat sensitive recording material F in the main scanning direction indicated by the arrow A with the thermal head 18, therefore, reproduces a two-dimensional image on the heat sensitive recording material F.

At this time, the area of the heat sensitive recording material F between the positions X$_1$, X$_2$ in the main scanning direction is thermally printed or recorded across the printing width W$_T$ of the thermal head 18 whereas the areas between the positions 0, X$_1$ and the positions X$_2$, X$_3$ are not recorded.

In the non-image areas between the positions 0 Y$_1$ and the positions Y$_2$, Y$_3$ in the auxiliary scanning direction within the area between the positions X$_1$, X$_2$, no pulses are supplied to the heating elements Tp0 through Tpn-1 of the thermal head 18. Therefore, all the non-image areas 52 (shown hatched in FIG. 6) remain black as no thermal energy is applied to the corresponding heating elements of the thermal head 18. When the heat sensitive recording material F thus recorded is placed on a light table such as an illuminating box so that a doctor or the like can observe the recorded image, the observer can closely observe the image over a long period of time for accurate medical diagnosis since no glaring light is permitted to pass through the non-image areas 52.

As can be understood from FIG. 6 which shows the thermally recorded heat sensitive recording material F, a medical image representing a sectional plane of a human brain, for example, has a high density level on the average. By employing the heat sensitive recording material F in which the thermally recorded area is transparent (corresponding to the lowest image density), the heat energy produced by the thermal head 18 is greatly reduced. As a result, the electric consumption by the image recording apparatus utilizing the heat sensitive recording material F is lowered, the air cooling fan and heat radiating fins may be removed from the image recording apparatus, and the power transformer used in the image recording apparatus may be reduced in size and weight. Consequently, the image recording apparatus can be smaller in size and lighter in weight. Since the heat energy produced by the thermal head is reduced, the image density variations or fluctuations due to the heat stored by the thermal head are prevented from taking place.

In the illustrated embodiment, the present invention is applied to a line printer having a line thermal head which has an array of heating elements arranged among the main scanning direction is employed. However, the present invention is also applicable to a serial printer having a thermal head which has several heating elements arranged in the auxiliary scanning direction and which is movable in the main scanning direction for recording an image.

The negative-positive reversal of image data may be carried out according to functions which do not have constant gradients but have negative differential coefficients as indicated by characteristic curves q$_2$, q$_3$ in FIG. 5, rather than the linear function q$_1$ having a negative gradient, so that images that are best suited to the properties of recording materials used and human body regions to be diagnosed.

Heat sensitive recording materials in which areas recorded by a thermal head are rendered transparent and the other background areas higher in density are also disclosed in Japanese Pat. application No. 62-287096 filed by the applicant. A disclosed heat sensitive recording material is a photo imaging material which includes microcapsules containing at least one of leuco dyes which are capable of forming colors on oxidation and at least one of photo-oxidizing agents. After at least one of reducing agents has been dissolved in an organic solvent which is insoluble or barely soluble in water, the solution is emulsified and dispersed outside of the microcapsules.

After an image has been thermally recorded on the heat sensitive recording material, light is applied to the entire surface of the recording material to activate the photo-oxidizing agent to cause unheated areas to form colors, thus producing a colored image.

With the present invention, as described above, a heat sensitive recording material in which a thermally recorded area is rendered transparent and the other area becomes higher in image density is employed to record characters, an image, or the like thereon with a thermal head, and image data corresponding to pulse currents to be supplied to the thermal head are subjected to negative-positive reversal. When the heat sensitive recording material on which an image is thermally recorded by the image recording apparatus is observed on a light table such as an illuminating box, since no undesired light passes through non-image areas on the recording material, the recorded image can easily be observed and the observer's eyes are less fatigued. If the image recording apparatus of the invention is used as a medical image recording apparatus, for example, which reproduces images at relatively high density levels, then the heat energy produced by the thermal energy is lowered, and high-quality images can be produced as they do not undergo density irregularities or fluctuations which would otherwise result from the heat stored by the thermal head. As a result, the electric consumption by the image recording apparatus is lowered, the air cooling fan and heat radiating fins may be removed from the image recording apparatus, and the power transformer used in the image recording apparatus may be reduced in size and weight. Therefore, the image recording apparatus can efficiently utilize an available space.

Although a certain preferred embodiment has been shown and described, it should be understood that many changes and modifications may be made therein without departing from the scope of the appended claims.

What is claimed is:

1. A method of recording an image on an image recording material, said image having a high density level of dark portions therein, by energizing a thermal head having a plurality of heating elements with input image data, wherein a majority of said input image data corresponds to dark image areas in said image, said method comprising the steps of:

employing, as said image recording material, a heat sensitive recording material comprising a support coated with a coating solution which makes an unheated area colored and a heated area transparent in a colorless or light colored manner; and recording an image on said heat sensitive recording material with the thermal head by processing said image data through negative-positive reversal and applying the processed image data to the thermal head, wherein said majority of image data corresponding to dark areas in said image is processed so that little or no heat energy is produced by said thermal head when said majority of image data is applied thereto.

2. A method according to claim 1, wherein said image data are processed through negative-positive reversal by converting the image data based on a function which has the input image data as a variable and a negative differential coefficient.

3. An apparatus for recording an image on a heat sensitive recording material, said image having a high density level of dark portions therein, said recording material comprising a support coated with a coating solution which makes an unheated area colored and a heated area transparent in a colorless or light colored manner, said apparatus comprising:

negative-positive reversal means for processing input image data through negative-positive reversal, wherein a majority of said input image data corresponds to dark image areas a thermal head having a plurality of heating elements energizable by the processed image data for recording an image on the heat sensitive recording material held against the thermal head based on said processed image data, wherein said majority of image data corresponding to dark areas in said image is processed so that little or no heat energy is produced by said thermal head when said majority of image data is applied thereto.

4. An apparatus according to claim 3, further including:

an A/D converter for converting the input image data into digital image data; and a frame memory for storing one frame, at a time, of said digital image data, and wherein said negative-positive reversal means comprises a negative-positive reversal processor for reversing the negative-positive relationship of said digital image data based on a function which has the digital image data as a variable and a negative differential coefficient.

5. An apparatus according to claim 3, wherein said heating elements of the thermal head produce thermal energy in response to the image data applied thereto, said thermal energy being of an intensity which increases depending on the amount of electric energy applied to said heating elements, said processed image data comprising data for reducing the amount of electric energy applied to said heating elements in proportion to the density of said processed data.

6. An apparatus according to claim 5, wherein said amount of electric energy is determined depending on the number of pulses applied to said heating elements within a predetermined period of time.

* * * * *